Figure 1:
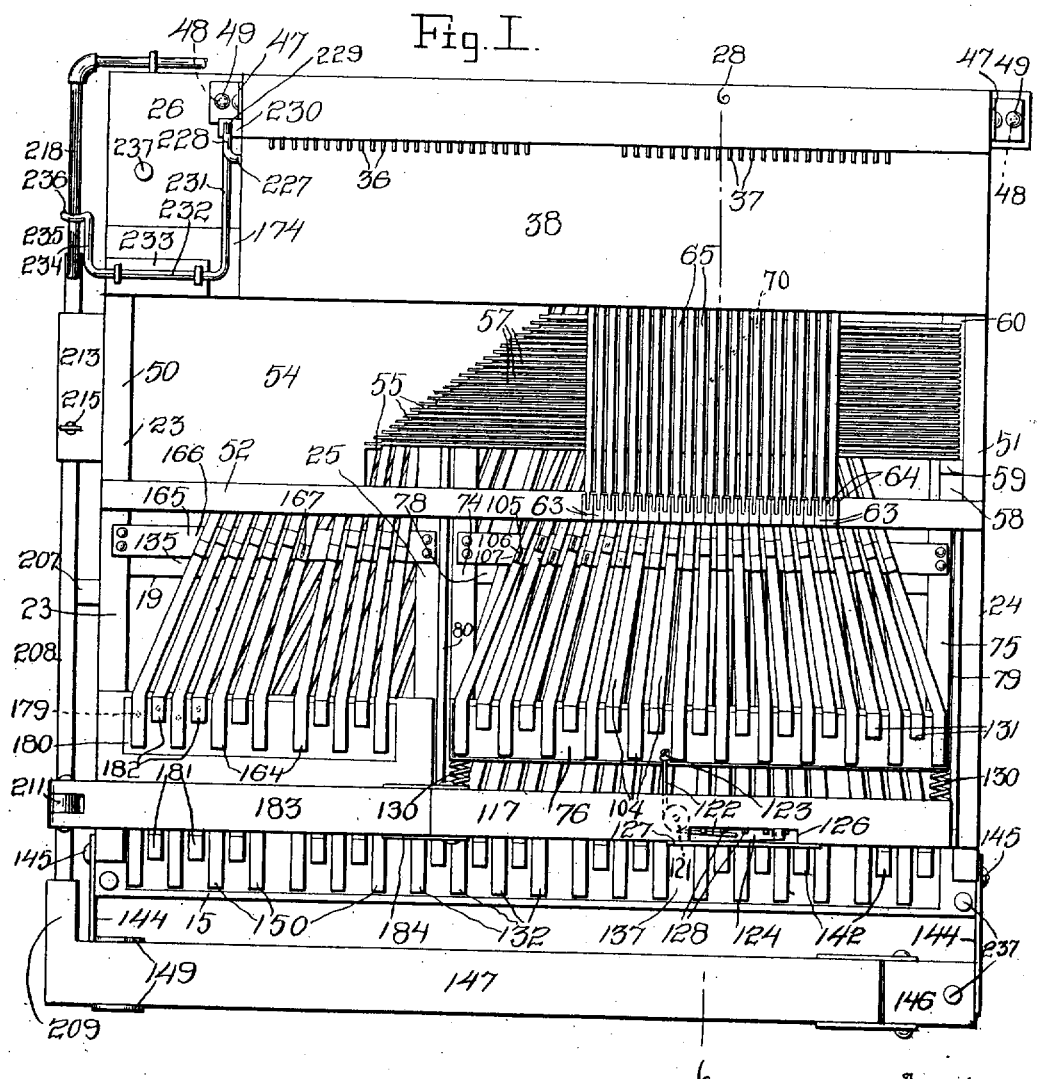

No. 888,939. PATENTED MAY 26, 1908.
H. L. SUTER.
STRINGED MUSICAL INSTRUMENT.
APPLICATION FILED AUG. 16, 1906.

9 SHEETS—SHEET 1.

Fig. I.

Witnesses
C. H. Reichenbach.
F. G. Smith.

Inventor
H. L. Suter.
By
Attorneys

No. 888,939. PATENTED MAY 26, 1908.
H. L. SUTER.
STRINGED MUSICAL INSTRUMENT.
APPLICATION FILED AUG. 16, 1906.
9 SHEETS—SHEET 2.
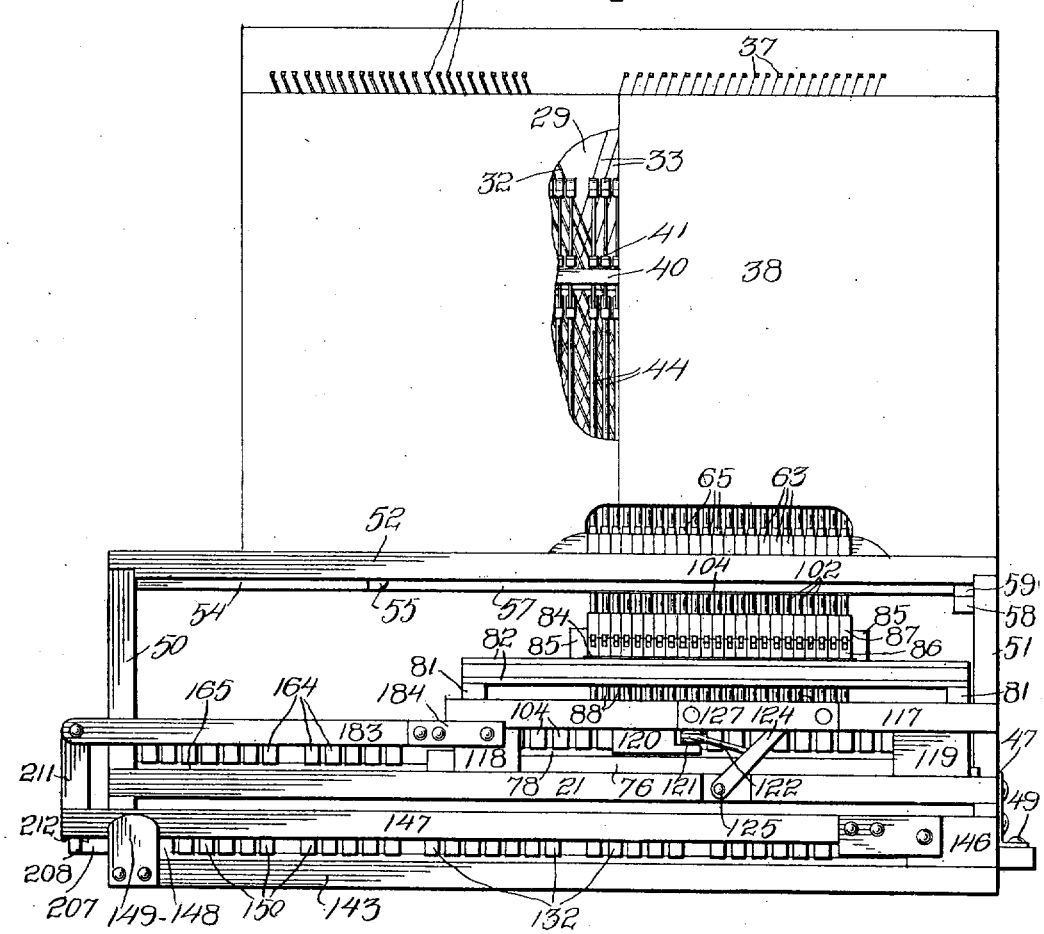
Fig. 2.
Witnesses
Inventor
H. L. Suter.
Attorneys No. 888,939. PATENTED MAY 26, 1908.
H. L. SUTER.
STRINGED MUSICAL INSTRUMENT.
APPLICATION FILED AUG. 16, 1906.
9 SHEETS—SHEET 3.
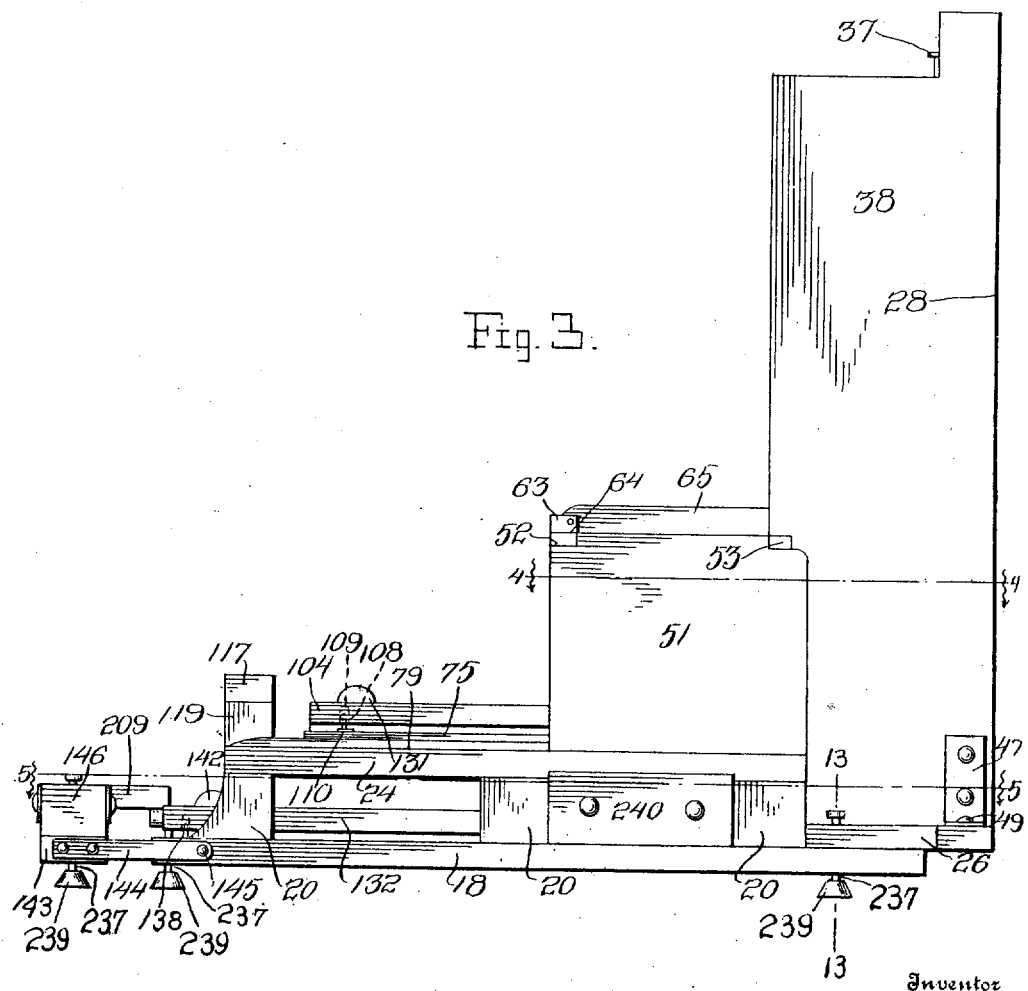
Fig. 3.
Witnesses
E. K. Reichenbach
F. G. Smith
Inventor
H. L. Suter
By 
Attorneys No. 888,939.

PATENTED MAY 26, 1908.

H. L. SUTER.
STRINGED MUSICAL INSTRUMENT.
APPLICATION FILED AUG. 16, 1906.

9 SHEETS—SHEET 4.

No. 888,939. PATENTED MAY 26, 1908.
H. L. SUTER.
STRINGED MUSICAL INSTRUMENT.
APPLICATION FILED AUG. 16, 1906.
9 SHEETS—SHEET 6.
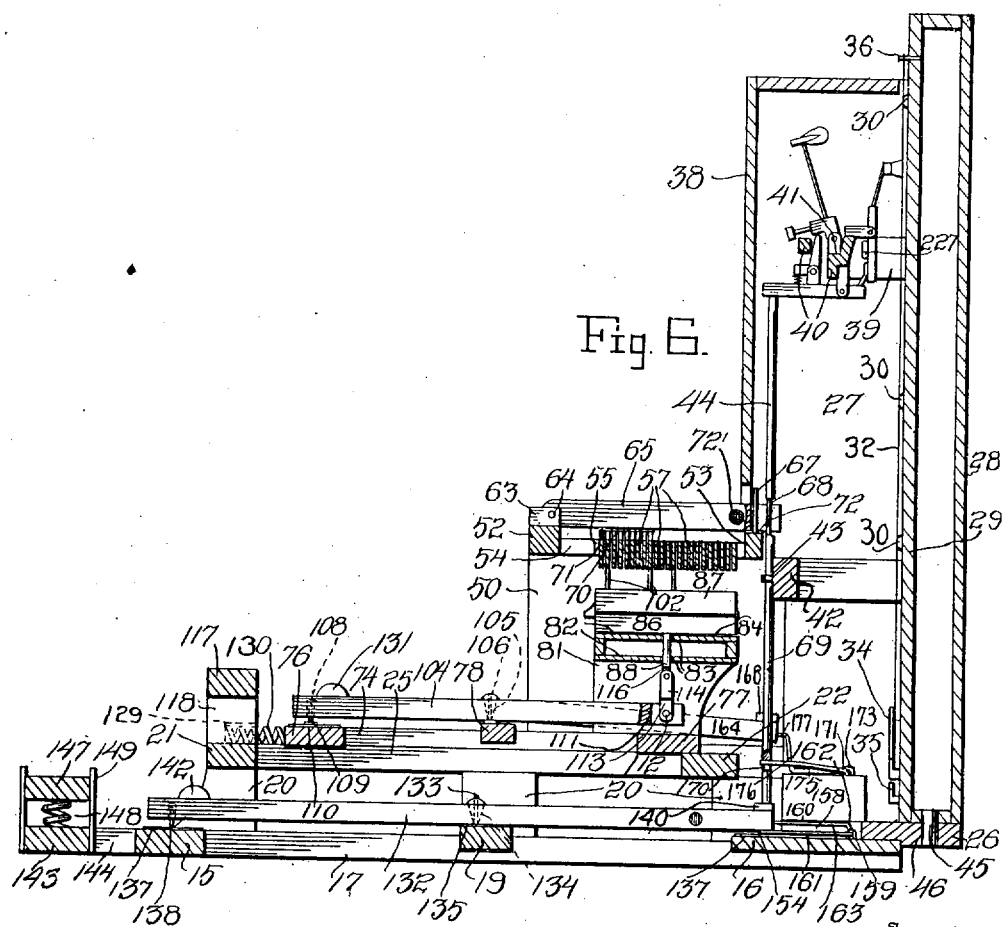
Fig. 6.
Witnesses
O. K. Reichenbach.
F. G. Smith.
Inventor
H. L. Suter,
By 
Attorneys.

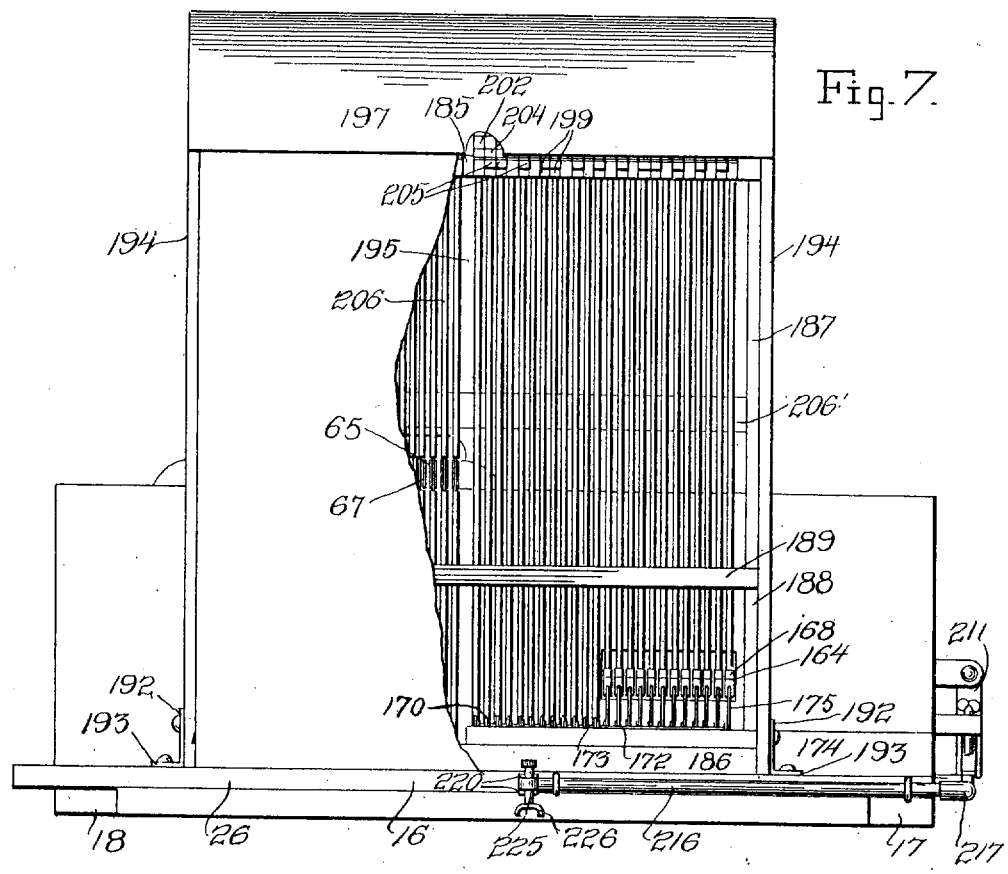

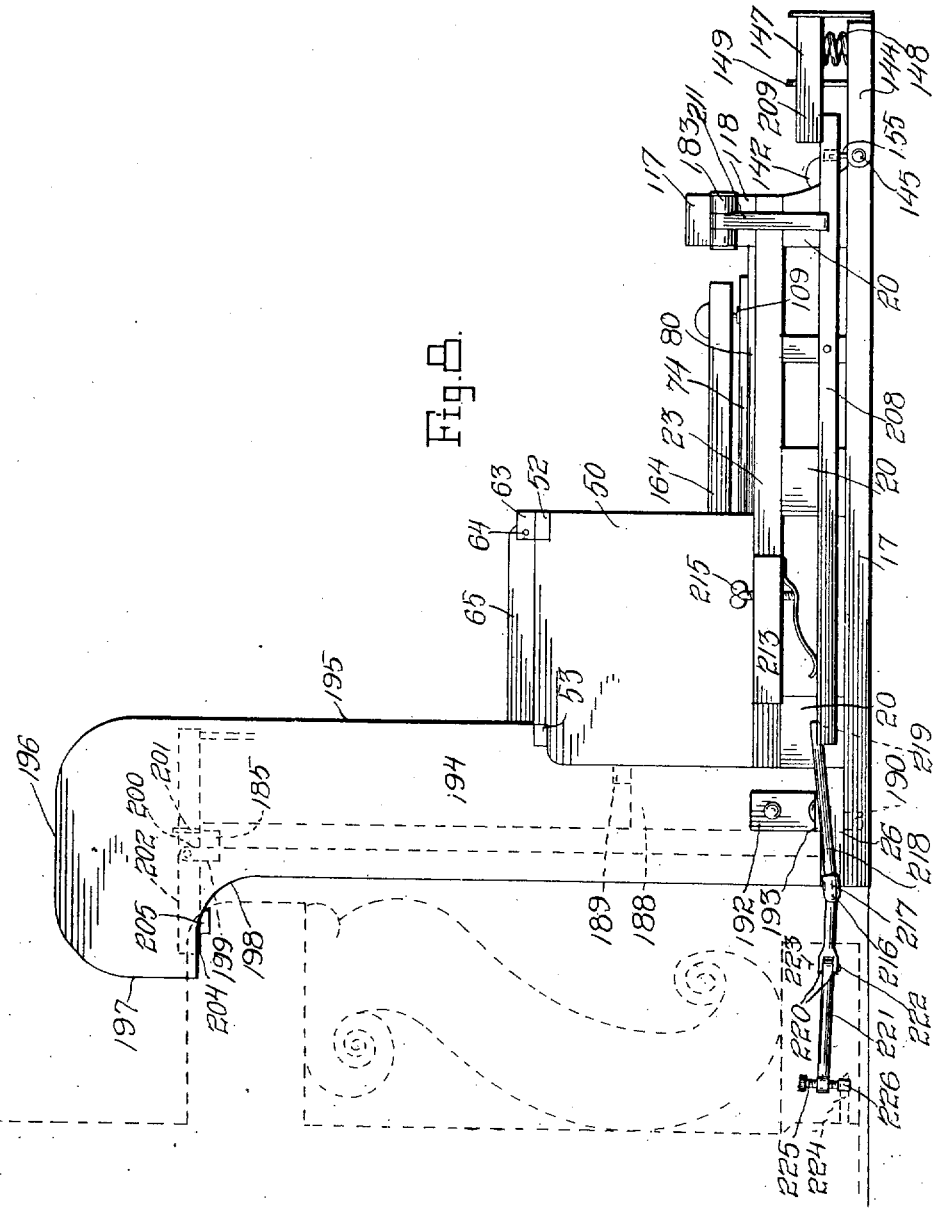

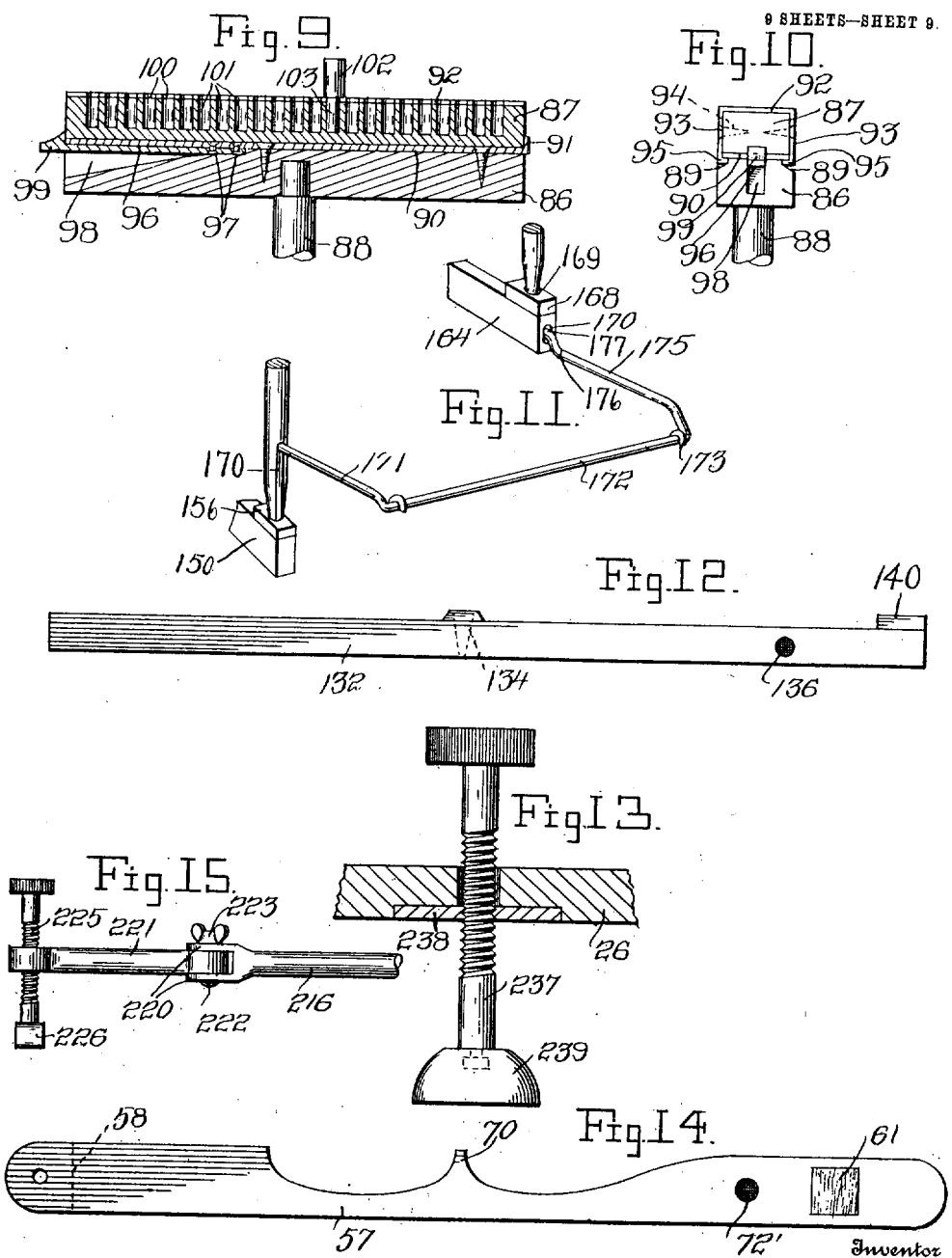

UNITED STATES PATENT OFFICE.

HARRY L. SUTER, OF HANNIBAL, OHIO.

STRINGED MUSICAL INSTRUMENT.

No. 888,939.  Specification of Letters Patent.  Patented May 26, 1908.

Application filed August 16, 1906. Serial No. 330,862.

*To all whom it may concern:*

Be it known that I, HARRY L. SUTER, a citizen of the United States, residing at Hannibal, in the county of Monroe, State of Ohio, have invented certain new and useful Improvements in Stringed Musical Instruments; and I do hereby declare the following to be a full, clear, and exact description of the invention, such as will enable others skilled in the art to which it appertains to make and use the same.

This invention relates to musical instruments and more particularly to stringed instruments adapted for the playing of chords by means of the feet, and the primary object of the invention is to provide a musical instrument of this character which may be played by a musician to accompany some other instrument being played by him, either by hand or mouth.

Although the instrument, as stated, is primarily designed for the playing of chords, the parts thereof are so arranged that broken chords or single notes may be played when so desired, either with or without an accompaniment.

The instrument primarily includes a sound-box having the usual strings which are strung as in an ordinary piano, and an operating mechanism for the piano action of the strings, but in order to adapt the instrument for use in connection with an ordinary piano and its keyboard, a piano fingering mechanism is provided which may be attached to the instrument in place of the sound-box above mentioned, it being understood that the principle of each of these parts of the instrument when considered in connection with the piano action operating mechanism, is substantially the same, the only difference lying in the fact that in one case the piano actions are directly operated, whereas in the other case they are indirectly operated.

The keys of the instrument by means of which the chords are struck are designed to be operated by the toe of the musician's shoe and heel-rest boards are provided for the support of the musician's heels, and are so arranged that any pressure exerted upon them by the heels, will serve to actuate the damper mechanisms either of the sound-box or the piano in connection with which the instrument is used.

The instrument includes a series of levers, a series of single note keys, and a series of bass keys which are coupled in octaves in such a manner that a double bass accompaniment may be produced, if desired, although single bass notes may be played.

Figure 4:
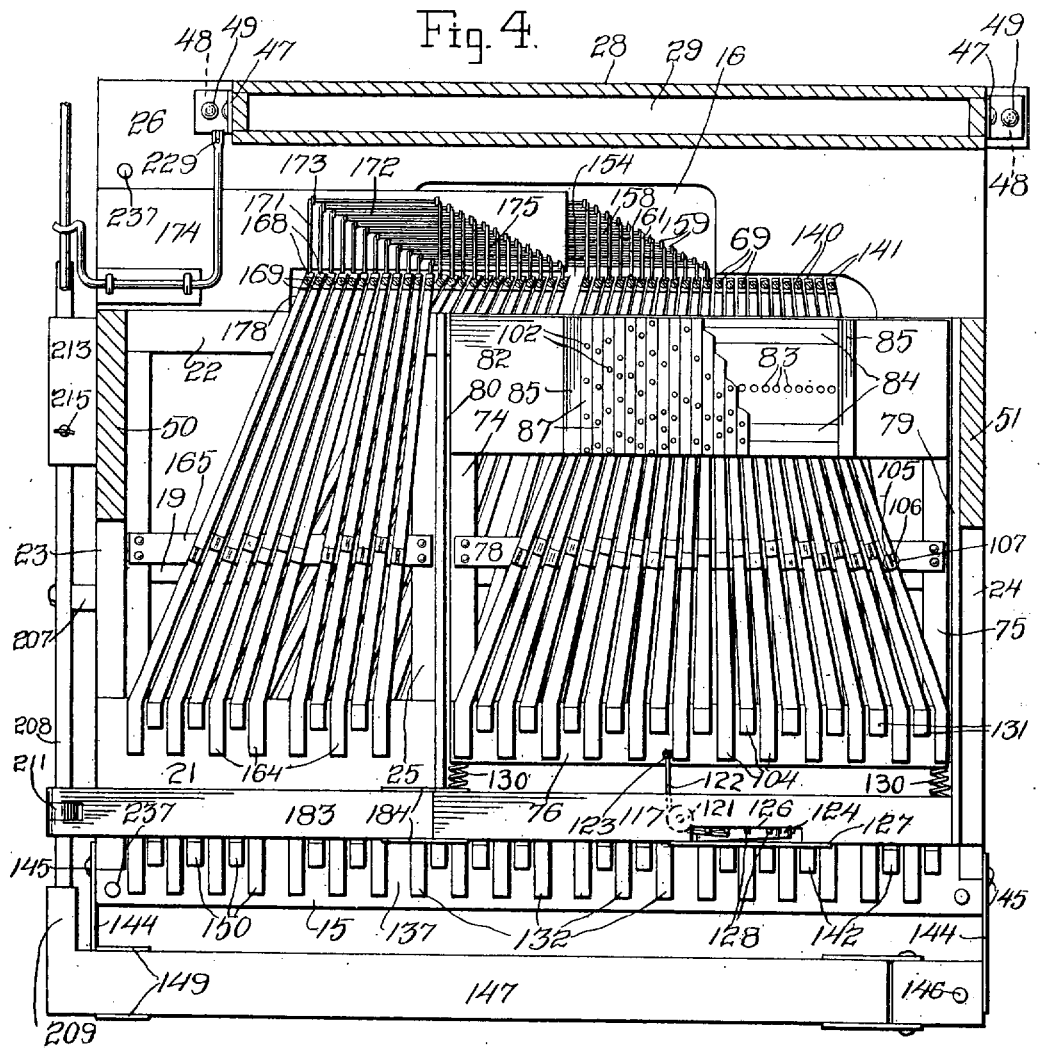
Figure 5:
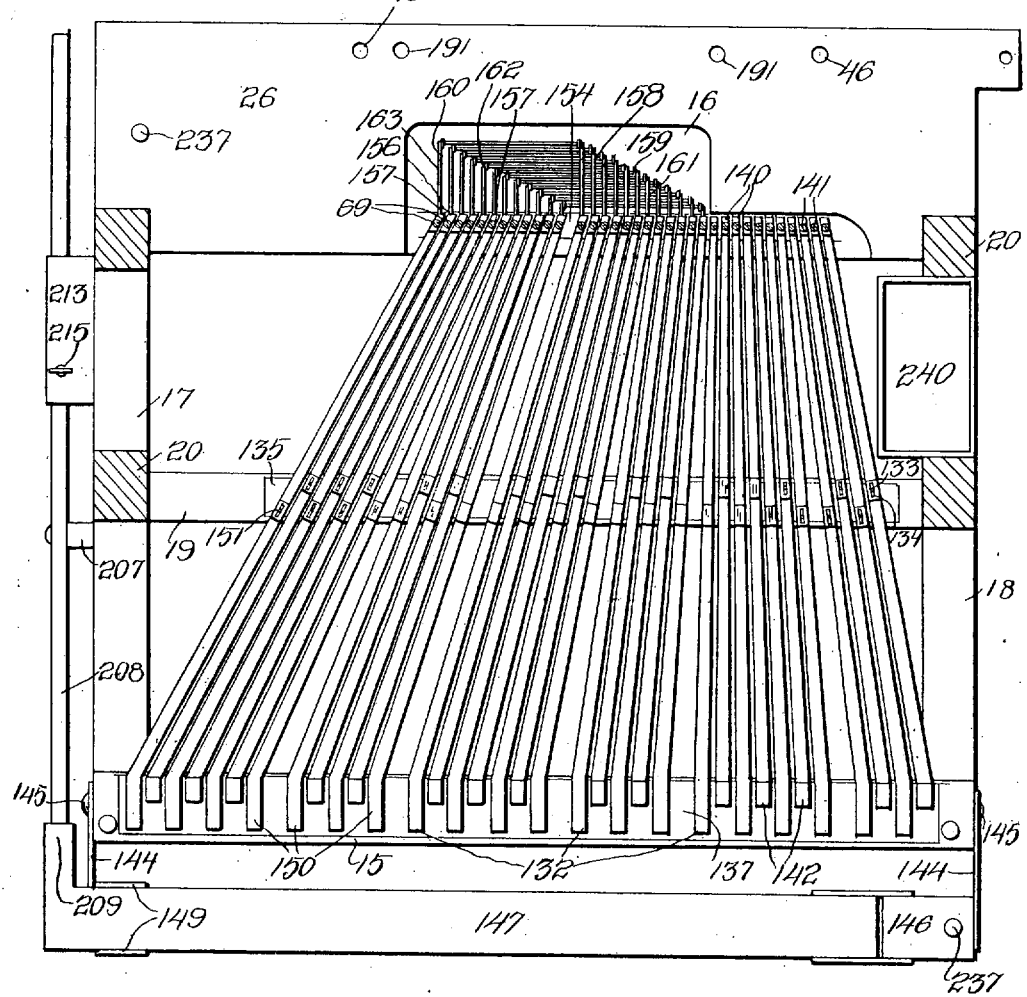

In the accompanying drawings: Figure 1 is a top plan view of the instrument. Fig. 2 is a front elevation thereof, parts of the casing for the sound-box being broken away. Fig. 3 is a side elevation of the instrument. Fig. 4 is a detail horizontal sectional view on the line 4—4 of Fig. 3. Fig. 5 is a similar view on the line 5—5 of Fig. 3. Fig. 6 is a vertical longitudinal sectional view on the line 6—6 of Fig. 1. Fig. 7 is a rear elevation showing the instrument with the piano fingering mechanism attached. Fig. 8 is a side elevation of the invention with the said mechanism attached and showing the manner of arranging the same against a piano. Fig. 9 is a detail vertical longitudinal sectional view through one of the chord-bars. Fig. 10 is an end elevation of one of the said bars. Fig. 11 is a detail view showing the connection for the double bass chords. Fig. 12 is a side elevation of one of the keys. Fig. 13 is a detail transverse sectional view on the line 13—13 of Fig. 3. Fig. 14 is a detail perspective view of one of the lifter-bars, and, Fig. 15 is a detail view in side elevation of the piano-pedal engaging arm.

Referring more specifically to the drawings, the instrument comprises a rectangular base-frame including front and rear sills 15 and 16 respectively and side connecting sills 17 and 18 which serve to complete said frame. Extending from one to the other of the said side sills 17 and 18 intermediate the front and rear sills 15 and 16 and connected at its ends to the said side sills is a beam 19 and mounted upon the said side sills are blocks 20 which serve to support, in spaced relation, to the above described frame, a supplemental frame comprising front and rear beams 21 and 22 respectively, side connecting beams 23 and 24, and an intermediate beam 25 which extends from one to the other of the front and rear beams 21 and 22. Located at the rear end of the instrument and upon the beam 16 is a platform 26 which is designed for the support either of the sound-box or piano fingering mechanism of my instrument, which parts will be hereinafter more specifically described. As the instrument is primarily intended to be complete in itself, that form of the instrument including the sound-box will first be described.

The sound-box above mentioned is shown in Figs. 1, 2, 4 and 6 as comprising the usual frame 27, back 28 and sounding-board 29. Upon the said sounding-board are located the usual bridges 30 for the bass strings of the instrument and bridges for the strings of the treble-half of the instrument, the said strings being indicated respectively by the numerals 32 and 33 and being connected at their lower ends to string plates 34 and 35 as in the ordinary form of piano, and at their upper ends to the usual tuning keys 36 and 37 respectively. The sound-box includes the usual casing 38 and located within the casing and supported upon the sounding-board 29 and in spaced relation thereto by means of blocks 39 are piano-action supporting rails 40 which support the jack levers, hammers, &c. of the piano-action 41, which, as they are of the ordinary construction, require no extended description. For a purpose to be hereinafter described, a rail 42 is supported upon the board 29 in spaced relation with respect thereto and beneath and slightly in advance of the rails 40 and is provided at intervals along its forward edge with guide-yokes 43. Pivoted to each hammer is the upper end of a rod 44 which works in the corresponding guide yoke 43 and is designed to be reciprocated vertically by devices hereinafter described to actuate the hammer to which it is connected.

In order that the sound-box may be held securely upon the platform 16, I provide upon the bottom rail of the frame of the box, a pair of downwardly extending pins 45 which are designed for engagement in openings 46 formed at corresponding points in the said platform and provide at the lower end of each stile of the frame, an angle bracket 47 which is provided in one of its wings with bolt openings 48 for the passage of bolts 49 therethrough and the ends of the said platform 26. As a matter of convenience, the tuning pins 36 of the sound-box are located in a plane above the top of the casing 38 so that the instrument may be tuned without the necessity of opening the casing.

The arrangement or means by which the treble notes may be played either in chords or singly is best shown in Figs. 1, 4, 6, 9, 10 and 14 and will now be described in detail. Supported upon the beams 23 and 24 of the supplemental frame is a frame including side boards 50 and 51 which are supported by the said beams respectively, and which are connected by means of a front beam 52 and a rear connecting beam 53. A board 54 is secured at one of its edges to the side board 50 adjacent the upper edge thereof and at one of its adjacent edges to the rear connecting beam 53 of the frame above described and is provided along its remaining edge with a plurality of apertured ears 55. It will be understood that this edge of the board extends at an angle to the said side board and beam of the frame and the said series of ears extends in a like direction, the portion of the edge of the board intermediate each ear and the adjacent ear being cut away for the reception of one end of a lifter-bar 57, there being a series of such bars, as will be readily understood. These bars 57 extend transversely of the instrument and rest at their opposite ends upon a cleat 58 which is secured to the inner face of the side board 51 in a plane with the under face of the board 54, the said bars being positioned between the rear connecting beam 53 and a block 59 carried by the said cleat 58, the purpose of the block being to prevent lateral movement of the bars. To render the movement of the bars entirely noiseless, a strip of felt 60 is secured upon the upper face of the cleat 58 between the rear connecting beam 53 and the block 59 and prevents the bars contacting with the cleat 58 itself.

In order to prevent the bars making any noise by moving against each other, a small piece of felt 61 is secured to one side of each bar at the end thereof opposite the end at which it is pivotally connected to the board 54, the said felt padding serving to hold the bars in very slightly spaced relation. These lifter-bars are designed to be raised through the medium of chord bars and other devices which will be presently specifically described.

Secured upon the front rail 52 of the frame in which the lifter-bars are mounted, is a series of blocks 63 which are each provided with a pair of apertured ears 64, and pivoted at their forward ends between the ears of each pair are levers 65 which rest with their rear ends upon the rear connecting beam 53 of the frame. The levers are bifurcated at their rear ends as at 66 and secured upon the said beams 53 and extending upwardly therefrom and through the bifurcations formed in the ends of the said levers are guide-pins 67 which serve the double function of guiding the levers during their vertical movement and enabling them to maintain their alinement. As shown in the drawings, the levers extend at their rear ends beyond the beam 53 and each receives in its bifurcation a pin 68 which connects the corresponding connecting-rod 44, which is located above the said lever with a similar rod 69 which extends in a common vertical plane with the rod 44 but below the said levers, for a purpose to be hereinafter set forth. In order that when the lifter-bars 57 are raised, the levers 65 may also be raised, each of the said lifter-bars is provided upon its upper edge and intermediate its ends with a finger 70 which contacts with the under side of the corresponding lever 65, it being understood that the number of levers corresponds to the number of lifter-bars. At their point of contact with the fingers 70 of the lifter-bars, the levers are provided upon their under edges with felt pads 71 which prevents noise being created by the said contacting of the fingers with the said levers and for the same purpose, a strip of felt 72 is provided upon the upper edge of the beam 53 between the blocks 66 thereon. In order to insure the returning of the lifter-bars 57 and levers 65 to their normal positions after being raised, a bore is formed through each of the said bars and levers and the said bore is then filled with lead as indicated by the numeral 72'. From the foregoing, it will be seen that when the lifters are raised, the corresponding levers will also be raised, thereby raising the connecting-rod 44 to actuate the piano action.

I will now proceed with a detail description of the means for actuating the lifter-bars and also the levers. The said means comprises a transposing frame including side sills 74 and 75, front and rear sills 76 and 77 respectively and an intermediate cross connecting beam 78. Cleats 79 and 80 are disposed upon the side and intermediate sills 24 and 25 respectively and upon the said sills and between the said cleats is slidably disposed the frame above described. Mounted upon each of the side sills 74 and 75 of the said frame and at the rear ends thereof, are blocks 81 and resting with its ends upon the said blocks and secured thereupon in any suitable manner is a chord-bar-supporting platform comprising spaced plates 82 through which are formed alining series of openings 83 and upon the upper face of the upper plate at the longitudinal edges thereof are secured strips 84 of felt or other suitable cushion material. Cleats 85 are also secured upon the upper face of the top plate 82 at points adjacent its ends and disposed upon the said top plate 82 between the said cleats 85 is a series of chord-bars. Each of the said chord-bars comprises a pair of superposed members indicated in Figs. 9 and 10 by the numerals 86 and 87, the member 86 being provided with a downwardly extending pin 88 which is engaged through the alining openings in the said plates 82 and causes vertical movement of the said chord-bars for a purpose which will be presently described, it being understood that the said bars are guided in their movement by the next adjacent bars and that the end ones of the series are guided by those next to the end and by the cleats 85 and furthermore, that the engagement of the pins 88 in the openings in both plates serves to prevent turning of the bars during their vertical movement. The section 87 is removably engaged upon the section 86 and for this purpose the edges of the last-named section of each bar at the upper face thereof are beveled as at 89 and upon the said upper face of the said section of each of the bars is secured a strip 90 which extends longitudinally of the said section and throughout the entire length thereof and has its rear end bent upwardly as at 91 at right angles to its main portion. The section 87 is provided with a casing including a connecting or intermediate portion 92 and side portions 93, the connecting or intermediate portions 92 being arranged to cover the upper face of the said section and the side portions 93 being designed to lie against and cover the sides thereof, the casing being secured in this manner upon the said section 87 by means of screws or other suitable fastening devices 94 which are engaged through openings in the side members 93 and in the said section 87. The said side portions 93 extend below the lower longitudinal edges of the said section and are bent inwardly toward each other at right angles as at 95 and in spaced relation with respect to the under face of the said section, the flanges thus formed being designed for the reception therebetween and the under face of the said section of the longitudinal edge portions of the strip 90 to detachably connect the section 87 with the section 86, it being understood that the said section 87 is slid upon the section 86 from the end opposite the upturned end 91 of the strip 90. In order to hold the section 87 upon the section 86 after being thus engaged therewith, I have provided a spring latch member 96 which is secured as at 97 to the under side of the strip 90 adjacent its forward end and which works in a recess 98 formed in the said end of the section 86, the recess being of such depth that when the catch is depressed, a head 99 which is formed upon the free end thereof, will be lowered sufficiently to permit disengagement of the section 87 with the section 86. When the catch is released, it will spring upwardly into its normal position to prevent separation of the sections until desired. A series of openings 100 is formed through the connection or intermediate portion 92 of the casing for the section 87 and extends longitudinally thereof, the said openings being in registration with bores 101 formed at corresponding points in the said sections and opening through the upper face thereof. The numeral 102 denotes pins which are reduced at their lower end as at 103 for engagement through the openings in the connecting portion 92 of the casing and in the bores 101 formed in the said sections, it being understood that the said pins may be interchangeably seated in the said bores and that any desired number of pins may be thus disposed upon the section 87 within the limit of the number of openings or bores. Owing to the fact that the upper or pin-carrying section 87 of each chord-bar is removably engaged with the lower section 86 thereof it is possible to make use of a number of pin-carrying sections in which the pins are definitely located, and to remove one section and replace it by another having a different arrangement of pins.

The pins above mentioned are designed for engagement with the under edges of the lifter bars 57 and the said bars are provided upon their under edges and throughout the greater portion of their length with a strip of sheepskin or other suitable cushion material for contact by the chord-pins 102.

In order that the chord bars may be raised to cause the chord-pins 102 to engage the lifter-bars 57 beneath which they are located, I provide a series of chord keys 104 which are clearly shown in Figs. 1, 4 and 6, provided intermediate their ends each with an opening 105 for the engagement therethrough of a pin 106 of a series which extends upwardly from the intermediate cross-beam 78 of the sliding transposing frame, the said cross-beam being located in a plane slightly above the upper face of the front beam 76 to permit rocking movement of the keys upon the said cross-beam 78, the openings 105 being, for this purpose, of greater length at their upper ends than at their lower ends. Surrounding each pin 106 and secured to the upper face of the intermediate cross-beam 78 is a disk of felt or other cushion material 107 upon which the said keys rock. In order to guide the keys in their rocking movement and to prevent lateral movement thereof, I provide in the under edge of each key and at the forward end thereof a recess 108 in which is received a pin 109 which projects upwardly from the front beam 76 of the transposing frame, there being a series of such pins, as in the case of the pins 107 and likewise a cushion 110 surrounding each pin. The rear end of each key is bifurcated as at 111 and received in the bifurcation and pivoted therein as at 112 is the reduced end 113 of a block 114 which is also bifurcated at its upper end for the pivotal reception therein of the lower reduced end 116 of the corresponding pin 88. It will be seen from the above that when the forward ends of the keys are depressed, their rear ends will be raised to lift the chord bars and the lifter-bars beneath which the pins of the chord-bars thus raised, are located, thereby raising the levers corresponding to the raised lifter-bars.

In order that the transposing frame 74, 75, 76, 77, 78 may be shifted to bring the chord-bars to various positions beneath the series of lifter-bars, and in order that one foot of the musician may be supported in position to strike with the toe of the foot, the chord keys 104, I provide a heel-rest board 117 which is supported upon blocks 118 and 119 which are located upon the front beam 21 of the supplemental frame of the instrument and journaled in a suitable bracket 120 secured on the under side of the heel-rest board 117, is a pulley 121 around which is engaged a cord 122 which is connected at one of its ends to the front beam 76 of the sliding chord-bar supporting frame, as at 123 and at its opposite end to a foot operated lever 124.

The said lever 124 is pivotally mounted as at 125 in a recess formed in the forward edge of the beam 21 of the supplemental frame and is designed for swinging movement in a vertical plane transversely of the instrument and moves with its upper end in a recess 126 formed in the forward edge of the heel-rest board 117. The lever is prevented from displacement from its recess by means of a plate 127 which is secured to the said forward edge of the heel-rest board and across the recess 126, the upper end of the lever being thus located between the said plate and the rear wall of the said recess. From the foregoing it will be understood that when the chord-bar supporting frame or transposer 74, 75, 76, 77, 78 is at the rearward limit of its movement and the lever 124 is moved to the right, by the foot of the musician, the said chord-bar supporting frame will be shifted to the forward limit of its movement. In order to perfectly regulate the movement of this frame and to effect its retention in adjusted position, the rear wall of the recess 126 is provided with a series of forwardly projecting pins 128 arranged at equidistant points, which pins are adapted to be engaged by the lever 124.

Each of the blocks 119 is recessed in its rear face as at 129 and engaged in said recesses in each block is a helical spring 130 which bears with its rear end against the forward edge of the front beam 76 of the chord-bar supporting frame and exerts a tendency toward moving the said frame in the rearward direction of its movement. This tendency of the spring serves to maintain a tension upon the cord 122 and consequently normally hold the lever 124 in engagement with one of said pins, it being understood that the distance between that rear wall of the recess 126 and the plate 127 is greater than the thickness of the lever 124 and that consequently the lever may be moved slightly laterally with respect to the plane of movement transversely of the instrument to permit disengagement from the pins and permit swinging movement of the lever to shift the frame. The pins 128 are so positioned that each step in the movement of the chord-bar supporting frame or transposer will bring the pins of the chord-bars beneath the lifter-bars 57 which correspond to the notes next above or below the notes with which the bars, beneath which the chord-bars were located before being shifted, correspond. In other words, if the pins in one of the chord-bars are arranged to strike a chord including the notes A, C♯ and E when the frame is at the rearward limit of its movement, and the frame is then shifted one step forwardly, the pins will be so positioned as to strike a chord including the notes A♭, C and E♭ through the instrumentality of the lifter-bars 57 and chord-keys 65, as heretofore explained.

As shown in the drawings, the alternate chord keys 104 are of less length than the remaining chord keys of the series and are so arranged that their rear ends will be in alinement, but that their forward ends will terminate short of the forward ends of the remaining keys and each of the said alternate keys is provided at its forward end with an upstanding head 131 which permits depression of the said keys without interference with the remaining or major keys. Furthermore, it will be understood that the lever 124 may be readily disengaged from the pins 128 and shifted to the desired position by means of the heel of the musician's shoe and without the use of his hands.

In order that broken chords may be played or that single notes in the treble-half of the instrument may be struck, without producing a chord, I provide a series of single note keys 132 which are clearly shown in Figs. 5, 6 and 12 and are mounted for rocking movement upon the intermediate cross-beam 19 of the base frame of the instrument upon pins 133 which extend upwardly from the said cross-beams and through openings 134 formed in the said keys intermediate their ends, the said openings being, as in the case of the openings 108 in the chord keys 104, of greater length at their upper ends than at their lower ends, and the upper face of the said cross-beam being located in a plane slightly above that occupied by the front and rear beams 15 and 16 of the said frame. A strip 135 of felt or other suitable cushion material is disposed upon the said upper face of the beam 19 and upon the said strip rests the keys 132. The said keys 132 are of such length that when so rocked, their ends strike the beams 15 and 16, the keys being weighted as at 136 at their rear ends as in the case of the lifter-bars 57 for the purpose of causing their said rear ends to normally rest upon the said rear beam 16 of the base-frame of the instrument. To render the action of the keys 132 noiseless, a cushion-strip 137 preferably of felt, is provided upon the upper face of each of the beams 15 and 16 and in order to guide the keys during their rocking movement, a series of guide-pins 138 project upwardly from the forward beam 15 of the frame and into recesses formed in the under faces of the keys 132 at their forward ends. Upon the upper face of each key 132 at the rear end of the key is located a block 140 which is provided in its upper face with a recess 141 in which is received the lower end of the connecting-bar section 69. From the above, it will be seen that when the forward ends of the keys 132 are depressed, their rear ends will be raised, resulting in a vertical movement of the corresponding connecting-bars 44 and hence in an actuation of the corresponding piano sounding device. It will also be observed that, although the corresponding levers 65 will be raised, when the keys 132 are depressed, a chord will not be struck for the reason that the chord-bars themselves are not actuated. As in the case of the keys 104, the alternate ones of the keys 132 are headed at their forward ends as at 142 and have their said forward ends terminated short of the forward ends of the remaining keys of the series.

In order that the foot of the musician may be supported when striking the keys 132, I have provided a foot-support comprising a beam 143 which is hingedly connected with the forward beam of the base frame of the instrument by means of plates 144 which are secured at one of their ends, one to each end of the beam 143 and pivotally connected at their other ends to the corresponding ends of the beam 15, as at 145. Secured upon the upper face of the beam 143 at one end thereof, is a block 146 with which is hingedly connected a heel-rest board 147, the said board being arranged for swinging movement in a vertical plane and being arranged to normally overlie the beam 143. The heel-rest board 147 is however supported in spaced relation to the beam 143 by means of a helical spring 148 which is mounted upon the beam 143 and upon which rests the heel-rest board 147. The said board 147 is held against lateral movement by means of guide-plates 149 which are secured to the front and rear edges of the beam 143 at the end thereof opposite to the end at which the block 146 is located, the corresponding end of the heel-rest board being arranged to normally lie between the said plates. By hinging the foot-supporting means above described to the forward beam of the base frame of the instrument, it will be seen that the said foot-supporting means may be swung vertically and rearwardly to lie above the forward ends of the keys 132 and thus protect the said keys when the instrument is not in use and it further serves the purpose of economizing in space.

The invention also contemplates the provision of means whereby single bass notes may be played, or if desired, a double bass accompaniment may be produced and to this end a number of single bass note keys 150 are provided and are mounted for rocking movement upon the intermediate cross-beam 19 of the base frame of the instrument by means of pins 151 which are engaged through openings in the said keys as in the case of the keys 132, and the said keys 150 have their rear ends weighted and rest with their said ends normally upon a cushion strip 154 which is secured upon the upper face of the rear cross beam 16 of the said frame. As in the case of the keys 132, the keys 150 also rest upon the strip of cushion material which is secured upon the upper face of the intermediate cross beam 19 and are guided by means of pins 155 which project upwardly from the upper face of the forward beam 15 of the base frame and into recesses formed in the under edges of the said keys at their forward ends. The keys 150 are located to one side of the series of keys 132 as shown in the drawings and in position for actuation by the toe of the musician's shoe while his heel is resting upon the heel-rest board 147, and each of the keys is provided upon its upper edge and at its rear end with a block 156 which is recessed in its upper face as at 157 for the reception therein of the lower end of the corresponding connecting bar for the higher notes of the bass half of the string.

In order that the keys 150 may be coupled in octaves with the lower keys of the series 132 so that when one of the keys 150 is struck, the coupled key of the series 132 will also be actuated, I provide a plurality of coupling members 158 which are shown in Figs. 1 and 4 and comprise each a rod which is mounted for rocking movement upon the rear beam 16 of base frame of the instrument in suitable brackets 159 and which has its end cranked as at 160 and 161, the end 160 being bent upwardly adjacent its end as at 162 and thence forwardly as at 163 to extend into a recess 164 formed in the rear end of the corresponding key 150. The crank end 161 of the coupling member is directed forwardly and extends to a position beneath the key 132 which is an octave higher than the key 150 to which the cranked end of the coupling member is connected. It will be understood from the foregoing that the end 161 of the coupling member is not connected with its corresponding key 132, but merely rests beneath the end of the same thus permitting movement of the key independent of the coupling member, it being understood that by this means a single bass note may be struck when so desired.

In order that double bass chords may be played upon the instrument, a number of double bass chord keys 164 are provided, the said keys being mounted for rocking movement upon a cross-piece 165 which is supported by means of one of the side beams of the supplemental frame of the instrument and the intermediate frame 25 thereof, there being a cushion 166 of felt or other material secured upon the upper face of the said cross-piece. The said keys are mounted as in the case of the keys previously described, by means of upstanding pins 167 which project into openings formed through the said keys, and the keys are weighted at their rear ends and provided at their said ends and upon their upper faces with blocks 168 which are recessed as at 169 for the reception of the lower end of the connecting bars for the bass portion of the piano action. The lower ends of the connecting bars which rest upon the blocks 156 carried by the keys 150 are bifurcated as at 170 and in the bifurcation of each bar is engaged one of the cranked ends 171 of one of a series of coupling members 172 which are mounted, as in the case of the coupling members 158, in suitable brackets 173 upon a block 174 which, in turn is mounted upon the platform 26 at the rear end of the instrument. The other end of each coupling member is directed forwardly as at 175 and thence upwardly as at 176, after which the extreme end of the portion 176 is bent as at 177 to extend forwardly and into a recess formed in the rear end of the corresponding key 164.

From the foregoing, it will be seen that when any one of the keys 164 is struck, the bass key of the series 150 which is one octave higher that the key 164, will also be struck, in this manner producing a double bass chord, it being understood however that by reason of the bifurcation in the lower end of each of the connecting bars for the keys 150, and the projection thereinto of the cranked end 171 of the corresponding coupling members for the chord keys, and one of the keys 150 may be struck without interfering with the keys 164. The keys are guided in their rocking movement as in the other keys of the instrument by means of upstanding pins 179 which are located upon the forward beam 21 of the supplemental frame and project into recesses formed in the under sides of the forward ends of the said keys, there being also a cushion strip upon the upper face of the said beam. As in the case of the keys 104 and 132, the keys 150 and 164 are alternately headed, the headed keys being of less length than the remaining keys of each series.

In order that the musician's foot may be supported in position for striking the double bass chord keys, a heel-rest board 183 is hinged at one of its ends to the block 118 by means of plates 184 which are secured at one of their ends to opposite sides of the said board 183 and pivotally connected at their opposite ends to the block 118.

In order that the chord mechanism of the instrument may be used in connection with an ordinary piano to play the various chords produced by the instrument in connection with its sound-box, a piano fingering mechanism (shown in Figs. 7 and 8) is provided which may be attached to the instrument in place of the said sound-board and the parts directly connected therewith. The said fingering mechanism comprises a rectangular frame including upper and lower sills 185 and 186 respectively and stiles 187. Secured to the rear faces of the stiles 187 adjacent their lower ends and extending forwardly therefrom are brackets 188 which support a beam 189, the beam being in this manner supported in rear of the stiles 187 and in a plane above the sill 186. Upon the under side of the sill 186 is formed a pair of downwardly projecting studs 190 which, when the fingering attachment is in position upon the instrument, seat in openings 191 formed in the platform 26 at the rear end of the instrument. Brackets 192 are secured to the stiles 187 of the frame for the fingering mechanism and include wings 193 which project laterally at right angles from the extreme lower ends of said stiles and rest against the upper face of the said platform, there being screws or other suitable fastening devices engaged through the said wings 193 and into the said platform to securely hold the attachment thereupon.

A casing is provided for the frame above described and the fingering mechanism which will presently be specifically explained, and the said casing comprises sides 194 which are secured to the outer faces of the stiles and the brackets 188, a back 195, a top 196 and a front 197 which extends downwardly to a point in a plane with the upper sill 185 of the frame above mentioned. When in position against the front of a piano, the lower edge of the front 197 is designed to rest along the keyboard of the piano directly in rear of the keys thereof, and the sides 194 of the casing are cut away as at 198 to permit the attachment to be thus located. Upon the front face of the beam 185 is secured a series of brackets 199 including each a pair of spaced apertured ears 200. Projecting upwardly from the said beam and directly in rear of each of the pairs of apertured ears 200 is a pair of guide-pins 201, and pivotally mounted between the said apertured ears of each pair is a striker 202 which also extends between the pins of the corresponding pair of guide-pins 201, lateral movement of the strikers being in this manner prevented. The forward ends of the strikers 202 are designed to contact with the corresponding keys of the piano key-board when the said strikers are rocked, and in order to prevent injury to the said piano keys and to render the impact of the strikers therewith, noiseless, I provide upon the under edge of each striker at its rear end, a cushion block 204. Those of the keys 202 which are designed to strike the white keys of the piano keyboard, are provided at their rear ends with heads 205, the said keys being, as is well known, lower than the black keys of the keyboard.

Connected to each of the strikers 202 is the upper end of a connecting rod 206 and the said connecting-rods are of the same construction respectively as those located within the sound-box for the instrument, according to whether they are used to connect the actuating or chord producing mechanism with the piano keys or piano action for the treble, bass or double bass chords and are designed for engagement and connection with the said chord producing mechanism as in the case of the said connecting-rods which are located within the sound-box. A strip 206 of felt is secured to the inner face of the back 195 of the casing for the fingering mechanism and prevents the connecting-rods 206 contacting with the said back.

As stated hereinbefore, the heel-rest boards 147 and 183 are hingedly mounted and hence have a vertical swinging movement, or in other words, may be depressed by the musician's heel and I utilize this movement for the purpose of actuating the tone-forte mechanism of either the sounding-board or the piano itself in connection with which the instrument is used, there being connections between the said heel-rest board and the said forte mechanisms, as will now be described.

Secured upon the side beams 17 of the base frame of the instrument is a block 207 to which is pivoted a lever 208, the said lever being thus arranged for rocking movement in a vertical plane. Formed upon the free end of the heel rest board 147 is a rearwardly extending projection 209 which is recessed in its under face for the reception of the forward end of the lever 208, and it is obvious that when the said heel-rest board is depressed by the heel of the musician, the said lever will be rocked. To relieve the lever 208 of the weight of the heel rest board, the helical spring 148 is disposed upon the beam 143 and bears against the under face of the said heel-rest board to support the same.

As a means for rocking of the lever 208 through the instrumentality of the heel-rest board 183, an arm 211 is pivoted to the free end of the said heel-rest board and depends therefrom and rests upon the said lever adjacent its forward end, the said arm being recessed in its lower end as at 212 for the reception of the said lever and for the purpose of preventing disengagement of the arm 211 therefrom. A cleat 213 is secured to one side of the side-board 50 of the chord-bar supporting frame and to the under side of the said cleat is secured the upper end of a leaf spring which extends downwardly and rearwardly from the said cleat with its free end in engagement with the upper edge of the lever 208, the object of the said spring being to normally hold the lever in engagement with the under side of the projection 209 and the lower end of the arm 211. A set-screw 215 is engaged through a threaded bore in the cleat 213 and impinges at its lower end against the upper face of the said leaf spring to serve as a means for adjusting the tension of the said spring.

Mounted upon the rear edge of the platform 26 is a rock-shaft 216 and connected with one end of the said rock-shaft by means of an elbow joint 217, is an arm 218 which extends at right angles to the said shaft and is engaged at its forward end in a recess 219 formed in the upper edge of the lever 208 at its rear end. The opposite end of the shaft 216 is bifurcated as at 220 and between the spaced portions formed by the bifurcation is engaged the forward end of an arm 221 the said arm being held in this relation to the said shaft by means of a headed bolt 222 which is engaged through the said spaced portions and the said end of the arm and upon which is engaged a thumb-nut 223, it being understood that by tightening the said nut, the arm 221 may be held securely in any desired position. The purpose of the arm is to provide a connection between the said rocking shaft and the forte-pedal of a piano, and the object of having the arm adjustable at various angles with respect to the shaft is to permit connection of the arm with the forte-pedal of a piano (indicated by the numeral 224), regardless of the location of the said pedal with respect to the piano keyboard; and in order that the pedal may be engaged regardless of its location with respect to the floor, I have provided an adjusting-screw 225 which is engaged through a threaded bore in the free end of the arm 221, and at the lower end of which is swiveled a pedal-engaging plate 226.

I have also provided a tone-sustaining mechanism for the sound-box for the instrument and the said mechanism comprises a bar 227 which is mounted at its ends in the sides of the casing for the box for rocking movement and is so arranged that when rocked, the dampers for the strings will be withdrawn from engagement therewith to produce a lasting tone. One end of the damper rod 227 extends outwardly of the casing for the sound-box and is cranked as at 228, and to the said cranked end of the damper-rod is pivotally connected the upper end of a connecting rod 229 which has its lower end portion slidably engaged through an opening formed in a bracket 230, the extreme lower end of said rod being in engagement with the cranked end 231 of a rocker 232 which is mounted for rocking movement upon a block 233 located upon the block 174. The opposite end of the rocker is directed rearwardly as at 234 and thence downwardly and rearwardly as at 235, the portion 235 of the said rocker being bent laterally and curved in the arc of a circle, as at 236 for engagement with the arm 218. From the above, it will be observed that when the lever 208 is rocked, the shaft 216 and the arm 218 will also be rocked and that by reason of the rocking movement of the said arm, the connecting member 232 will be rocked to raise the connecting-rod 229 and thereby operate the damper-bar.

Owing to the fact that the key-boards in different pianos are located at different heights with respect to the base of the pianos, means is provided whereby the entire instrument may be adjusted vertically and the said adjusting means comprises adjusting screws 237 each of which is engaged, in one corner of the base frame of the instrument and in a plate 238 which is countersunk in the underside of the said frame and at such point and is provided with a threaded aperture for the passage of the screw, each screw having at the lower end thereof a swiveled head 239 which rests upon the floor and supports the instrument. One of the above described adjusting devices is also located at each end of the beam 143 and serves as a means for adjusting this beam to locate the same in a common plane with the base frame of the instrument.

As a matter of convenience a drawer 240 is located in one side of the instrument between the side beams 18, and 24 of the base and supplemental frames respectively, for the reception of extra chord bars.

It is to be understood that I do not desire to be limited to the exact details of construction shown and described, for obvious modifications will occur to a person skilled in the art.

What is claimed is:

1. The combination, in a chord instrument, of a piano action, means for transposing the chords, part of said means being movable towards and from the piano action and thereby producing such transposition, and positive means for effecting said movement.

2. The combination, in a chord instrument, of a piano action, means for transposing the chords, part of said means being movable towards and from the piano action and thereby producing such transposition, and foot-operated means for effecting said movement.

3. The combination, in a chord instrument, of a piano action, means for transposing the chords, said means including a frame movable bodily towards and from the piano action and thereby producing such transposition, levers carried by said frame, positive connections between the levers and the piano action, means for operating the levers, and means for effecting the movement of the frame.

4. The combination, in a chord instrument, of a piano action, a frame, chord-bars carried by the frame, and positive means for moving the frame towards and from the piano action and thereby transposing the chords produced by the chord-bars.

5. The combination, in a chord instrument, of a piano action, a frame, chord-bars carried by the frame, and foot-operated means for moving the frame towards and from the piano action and thereby transposing the chords produced by the chord-bars.

6. The combination, in a chord instrument, of a piano action, a frame, chord-bars carried by the frame, and positive means for moving the frame towards and from the piano action and thereby transposing the chords produced by the chord-bars, said means comprising a heel-rest board, a pulley carried thereby, a cord engaged with the pulley and connected at one end to said frame, and a lever connected to the opposite end of the cord.

7. The combination, in a chord instrument, of a piano action, a frame, chord-bars carried by the frame, and positive means for moving the frame towards and from the piano action and thereby transposing the chords produced by the chord-bars, said means comprising a heel-rest board, a pulley carried thereby, a cord engaged with the pulley and connected at one end to said frame, a lever connected to the opposite end of the cord, and a series of members with which the lever interchangeably engages.

8. The combination, in a chord instrument, of a piano action, a frame, chord-bars carried by the frame, each chord-bar consisting of a pair of superposed members, and positive means for moving the frame towards and from the piano action and thereby transposing the chords produced by the chord-bars.

9. The combination, in a chord instrument, of a piano action, a frame, chord-bars carried by the frame, each chord-bar consisting of a pair of superposed members, resilient means for holding the members of each chord-bar together, and positive means for moving the frame towards and from the piano action and thereby transposing the chords produced by the chord-bars.

10. The combination, in a chord instrument, of a piano action, a series of levers positively connected with the piano action, lifter-bars disposed directly beneath the levers, and means for raising the lifter-bars in groups, to elevate the corresponding levers.

11. The combination, in a chord instrument, of a piano action, a series of levers positively connected with the piano action, lifter-bars disposed directly beneath the levers, a series of chord-bars disposed beneath the lifter-bars and extending at right angles thereto, a series of pins carried by each chord-bar and adapted to contact with a group of lifter-bars, and means for actuating the chord-bars.

12. The combination, in a chord instrument, of a series of levers, lifter-bars disposed beneath the levers, a frame movable beneath the lifter-bars, chord-bars carried by said frame and extending at right angles to the lifter-bars, a series of pins carried by each chord-bar and adapted to contact with a group of lifter-bars, means for actuating the chord-bars, and means for transposing the position of said frame, to dispose the chord-bars beneath different lifter-bars.

13. A foot operated chord instrument including levers, lifter-bars arranged to actuate said levers when raised, chord-bars disposed beneath the lifter-bars, lifter-bar engaging pins carried by the chord-bars, and means for actuating said chord-bars.

14. A foot operated chord instrument including levers, lifter-bars arranged to actuate said levers when raised, chord-bars disposed beneath the lifter-bars, interchangeable lifter-bar engaging pins carried by the chord-bars, and means for actuating said chord-bars.

15. A chord instrument including levers, lifter-bars arranged to actuate said levers when raised, a shiftable support, chord-bars carried by said support and disposed beneath said lifter-bars, lifter-bar engaging pins carried by said chord-bars, means for actuating said chord-bars, and positive means for effecting the movement of said support, to dispose the chord-bar pins beneath different lifter-bars.

16. A chord instrument including levers, lifter-bars arranged to actuate said levers when raised, a shiftable support, chord-bars carried by said support and disposed beneath said lifter-bars, lifter-bar engaging pins carried by said chord-bars, means for actuating said chord-bars, and foot operated means for effecting the movement of said support, to dispose the chord-bar pins beneath different lifter-bars.

17. A chord instrument including levers, lifter-bars arranged to actuate said levers when raised, a shiftable support, chord-bars carried by said support and disposed beneath said lifter-bars, lifter-bar engaging pins carried by said chord-bars, keys for actuating said chord-bars, to raise said lifter-bars, and positive means for effecting the movement of said support, to dispose the chord-bar pins beneath different lifter-bars.

18. A chord instrument including levers, lifter-bars arranged to actuate said levers when raised, a shiftable support, chord-bars carried by said support and disposed beneath said lifter-bars, lifter-bar engaging pins carried by said chord-bars, keys for actuating said chord-bars, to raise said lifter-bars, and foot operated means for effecting the movement of said support, to dispose the chord-bar pins beneath different lifter-bars.

19. The combination, in a chord instrument, of a piano action, levers connected with the piano action for operating the same, lifter-bars disposed beneath the levers for actuating the latter in groups when raised, means for actuating the lifter-bars, and separate devices for operating the piano action without effecting the actuation of the lifter-bars.

20. The combination, in a chord instrument, of a piano action, rods connected with the piano action for operating the same, levers, each connected with a rod, devices for raising said levers and the rods connected therewith, in groups, means for actuating said devices, and separate devices for raising said rods singly without actuating the first-mentioned devices.

21. In a chord instrument, in combination, a piano action, endwise movable vertical rods connected with the piano action for operating the same, levers, each lever having its free end connected to a rod, devices for raising said levers and the rods connected thereto in groups, means for actuating said devices, and separate devices connected with said rods for actuating the same singly, without actuating the first-mentioned devices.

22. A foot operated piano including a piano action, a series of levers, a series of lifter-bars arranged to actuate said levers when raised, connecting rods between said levers and said piano action, means for raising groups of said lifter-bars, single note keys, and connections between said keys and certain of said rods, for actuating the latter independently of said lifter-bars.

23. A foot operated chord instrument including levers, lifter-bars for actuating said levers, chord-bars disposed beneath said lifter-bars, a shiftable frame for transposing said chord-bars, a foot-support arranged in advance of said frame, and frame shifting means carried by said foot-support.

In testimony whereof, I affix my signature, in presence of two witnesses.

HARRY L. SUTER.

Witnesses:
 ISAAC SUTER,
 DAVID HYER.